United States Patent [19]

Persson

[11] 4,391,403

[45] Jul. 5, 1983

[54] METHOD OF EXPLOSION-WELDING ROLLING BILLETS INTENDED FOR PACKAGE ROLLING

[75] Inventor: Ingemar P. Persson, Striberg, Sweden

[73] Assignee: Nitro Nobel AB, Gyttorp, Sweden

[21] Appl. No.: 253,822

[22] Filed: Apr. 13, 1981

[30] Foreign Application Priority Data

Apr. 23, 1980 [SE] Sweden .................................. 8003071

[51] Int. Cl.³ ............................................. B23K 20/08
[52] U.S. Cl. ................................................. 228/107
[58] Field of Search ....................... 228/107, 108, 109; 29/421 E

[56] References Cited

U.S. PATENT DOCUMENTS

| | | | |
|---|---|---|---|
| 3,735,476 | 5/1973 | Deribas et al. | 228/107 |
| 3,940,049 | 2/1976 | Richter et al. | 228/107 |
| 4,055,291 | 10/1977 | Peters | 228/108 |
| 4,095,734 | 6/1978 | Persson | 228/104 |

Primary Examiner—Kenneth J. Ramsey
Assistant Examiner—M. Jordan
Attorney, Agent, or Firm—Hane, Roberts, Spiecens & Cohen

[57] ABSTRACT

A method of manufacturing a compound plate by explosion-welding, the compound plate being intended for package-rolling. The plating material is smaller in area than the base material so that an edge is formed around the periphery of the base material, this free edge surface being protected by the attachment of metal strips, after which an explosive charge, the area of which is at least as great as that of the base material, is placed on top of the plating material and detonated.

5 Claims, 8 Drawing Figures

METHOD OF EXPLOSION-WELDING ROLLING BILLETS INTENDED FOR PACKAGE ROLLING

BACKGROUND OF THE INVENTION

Certain combinations of explosion-welded material, such as stainless steel/carbon steel, nickel alloys/carbon steel, titanium/carbon steel, and so on are rolled after being joined together, so as to give a larger format of reduced thickness.

This procedure is known and has been used for many years.

Normally the explosion-welded plates are rolled one by one. However, in some cases, if a thinner final product is required or if unfavourable flow in the rolling process is to be reduced, a method known as package rolling is used, i.e. two plated sheets (compound sheets) are placed together with the plating sides facing each other, and the package is welded around the edges. The complete package is then welded.

To enable this package manufacture, the area of the plating material must be less than that of the base material, so that a free edge of base material is left around the plating material.

However, when explosion welding material of the thicknesses normal in this connection (10 mm–30 mm plating thickness), this known technique requires the entire surface of the base material to be plated and the edge of the plating material must therefore be removed after joining and before package-welding, by means of planing, for instance.

SUMMARY OF THE INVENTION

The present invention relates to a method in which the expensive removal of the edges of the plating material is eliminated by the use of a special explosion-welding technique, described below, in which the edges of the base material are left free, either so that the two plated sheets which are to form the package are explosion-welded one by one or so that both sheets are coherent at the moment of firing and are separated after the joining process (tandem joining). By using the method of linear initiation of the explosive charge, known per se, the plates will in most cases be sufficiently flat after the firing to avoid the necessity of aligning them prior to package maufacture.

A number of figures of drawing are presented to facilitate description of the process.

DETAILED DESCRIPTION

A more detailed description of the process follows, with reference to the drawings. The numbering of the parts is the same throughout.

Figure 1:
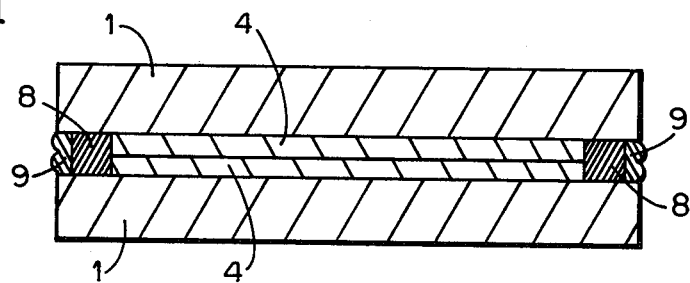
FIG. 1 shows in cross-section the explosion-welded plates arranged according to the known technique, for package rolling.

FIG. 1 illustrates the known technique for package rolling in which two compound plates are placed together to form a package ready for rolling. The base plates, designated 1, and the plating sheets designated 4, are of different materials which are often difficult or impossible to weld together, as in the case of titanium and carbon steel, for instance, since a gas-tight joint is required. It is therefore easier and cheaper to weld only the base materials to each other.

The insert 8, which is usually of the same type of material as the base material, i.e. generally carbon steel, constitutes a protection for the plating material during welding, and serves as a bridge. In the case of thick plating sheets (10–30 mm each) the gap may otherwise be too large to achieve a tight weld joint between the base materials. The insert also has a favourable effect on the flow during rolling, i.e. it reduces the tendency of varying thickness in the plating sheets at the edges of the rolled compound plate.

Numeral 9 designates the weld joint around the edge of the package, which has already been mentioned.

Figure 2:
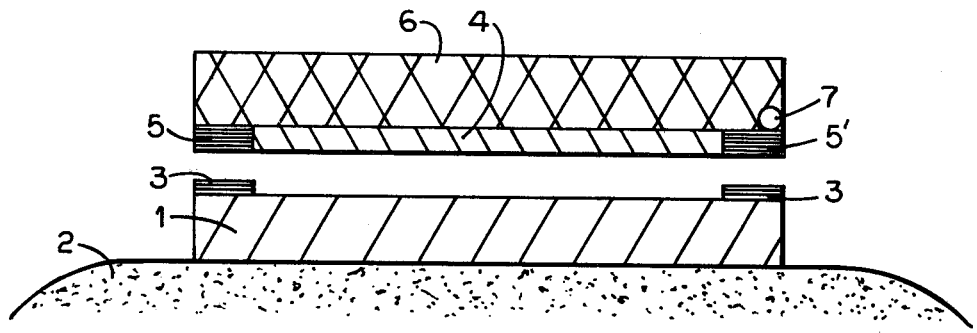
FIG. 2 shows a cross-section of an arrangement according to the present invention for producing a single plated sheet by means of explosion-welding, said plate to be included in a rolling package.

In FIG. 2 the base material 1 rests on a surface 2, a bed of sand, for instance. Thin strips of metal 3 have been applied by glueing, for instance, around the edges of the base material, on its upper surface.

The plating material 4 is applied in known manner, spaced from the base material 1, and its area is such that it fits inside the frame formed by the metal strips 3, or negligibly smaller than said frame.

The periphery of the plating material 4 is surrounded by expansion elements 5, 5', i.e. strips of metal of the same thickness as the plating material or at least of a thickness corresponding to ¾ of the plating material thickness. The expansion elements 5, 5' can be made of cheaper material than the plating material, such as carbon steel, and should be at least as wide as the metal strips 4. That is to say: the plating material together with the expansion elements should cover at least the area taken up by the base material.

The plating material and expansion elements are weighted in known manner with an explosive charge 6.

Figure 3A:
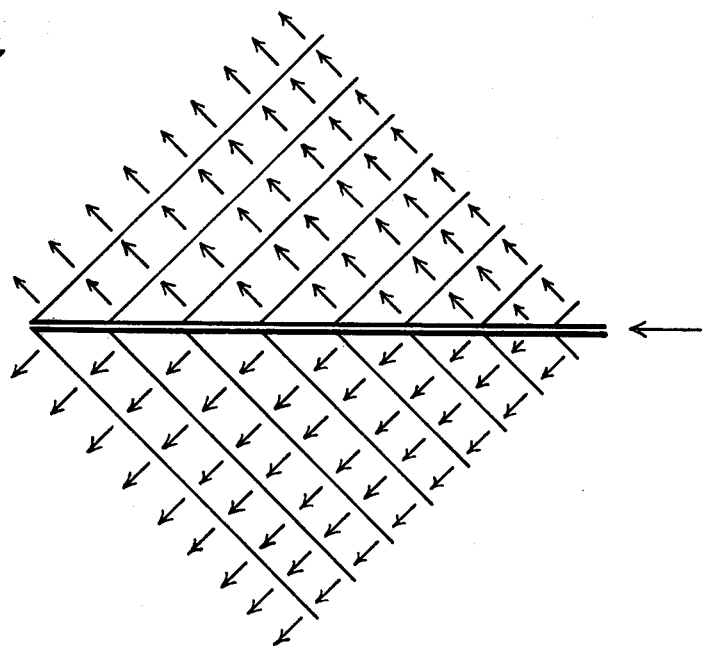
FIG. 3a shows schematically the extent of the detonation upon linear initiation.

In FIG. 2 the initiator 7 has been illustrated. This should preferably be a *linear initiator*, i.e. an initiator which is long and thin and initiates the detonation in the main charge along a line indicated in FIG. 3a, so that the plate will remain as flat as possible after the firing.

Figure 3B:
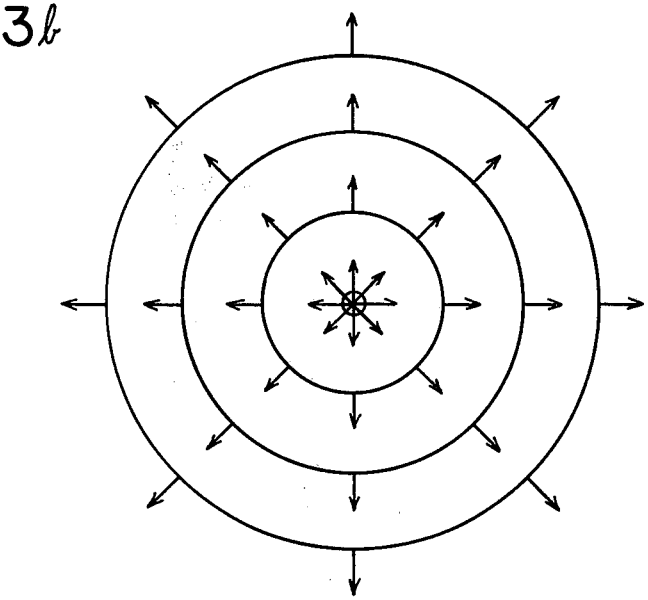
FIG. 3b shows the extent of the detonation at point initiation.

The explosive substance forming the initiator must obviously have a higher detonation velocity than the main charge. With *point initiation*, however, the initiator is limited to a small local area, and the detonation is initiated in the main charge so that it spreads spherically (FIG. 3b).

In the course of explosion-welding a bond is formed between the plating material 4 and the exposed part of the base material 1. The expansion elements adhere to the upper surface of the metal strips 3. Upon relief of the collision pressure the weaker glue joint between the lower surface of the metal strips 3 and the base material 1 is broken and the metal strips 3 are ejected together. Since the metal strips 3 cover the edge zones of the base material during the plating, these areas of the base material are protected from direct attack from accelerated material, and remain intact.

Figure 4:
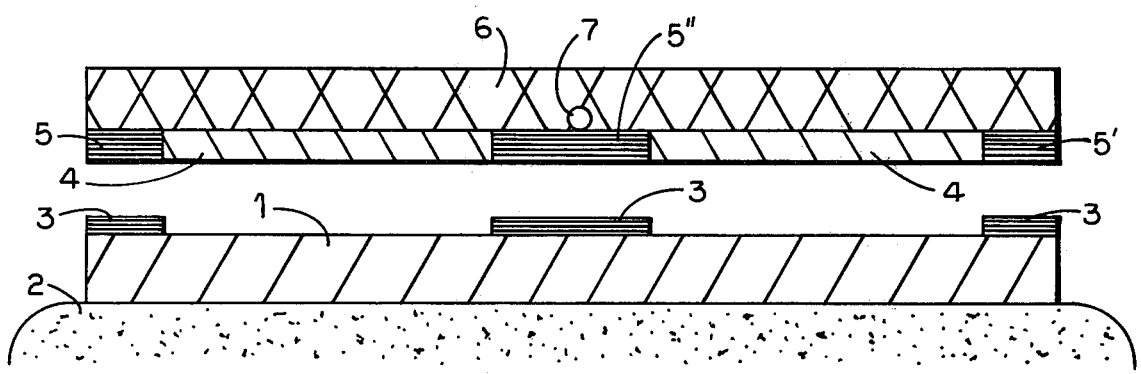
FIG. 4 illustrates in cross-section an arrangement according to the present invention for manufacturing the two plated sheets of the package by tandem joining.

When the package is to be rolled it consists of two identical compound plates. It therefore seems natural to perform the explosion-welding in a tandem arrangement as shown in FIG. 4. This can be done when the billets are of a moderate size, by which is meant that the total quantity of explosive substance in tandem firing does not exceed the approved maximum firing magnitude for the explosion-welding equipment, i.e. the greatest quantity of explosive substance which is permitted to be fired on each occasion in the installation in question, or that the weight of the material does not exceed the capacity of the available equipment. Tandem firing entails a considerable saving in cost in comparison with firing two individual plates.

It is clear from FIG. 4 that the same initiating charge 7 is used for both plating sheets 4. As indicated previously, the initiating charge is preferably linear. The main explosive charge is in one piece and covers an area corresponding to at least the whole surface of the base material.

Figure 5:
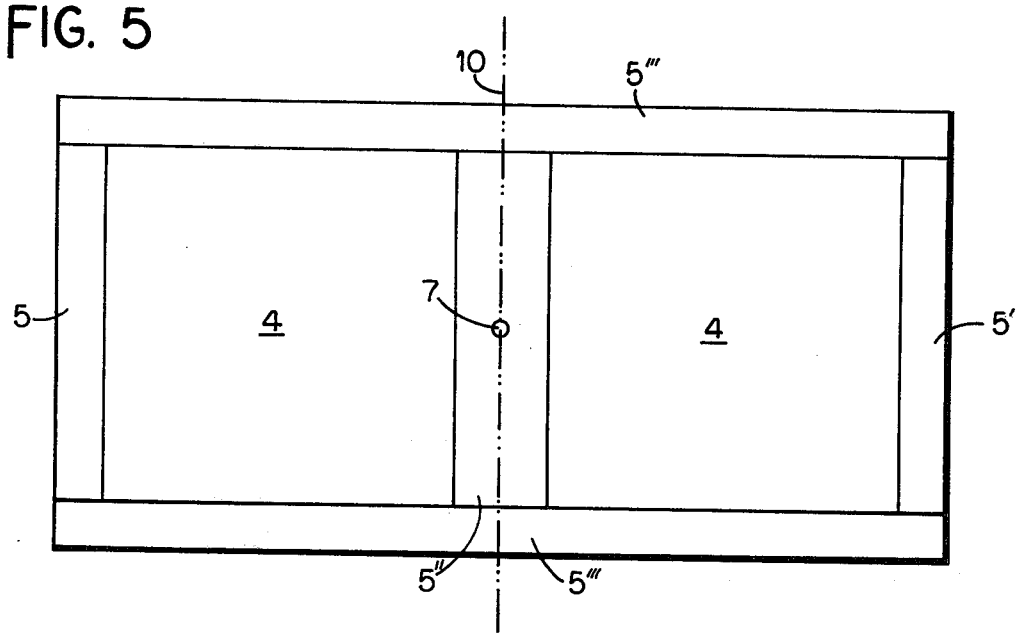
FIG. 5 shows the arrangement according to FIG. 4 seen from above (without explosive-charge) and with a point initiator.

In certain cases, for instance where the ratio between the thickness of the base plate and that of the plating sheets is great ($>5$), a point initiator may be used. In the case of tandem joining, therefore, the point 7 (FIG. 5) is preferably located centrally on the line of symmetry 10 of the central expansion element 5″, common to both plating sheets. However, in certain cases it may be located differently on the line of symmetry or even at some other point, to one side or in a corner, for instance.

Figure 6:
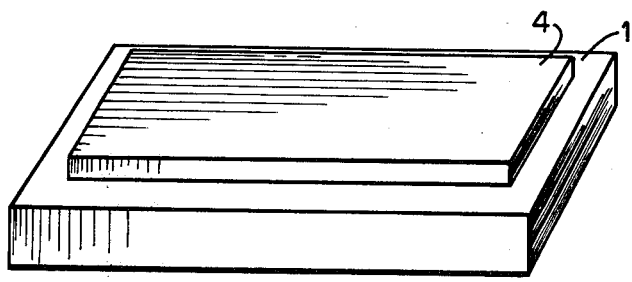
FIG. 6 is a perspective view showing the appearance of the plated sheet after explosion-welding one plating sheet to the material.
Figure 7:
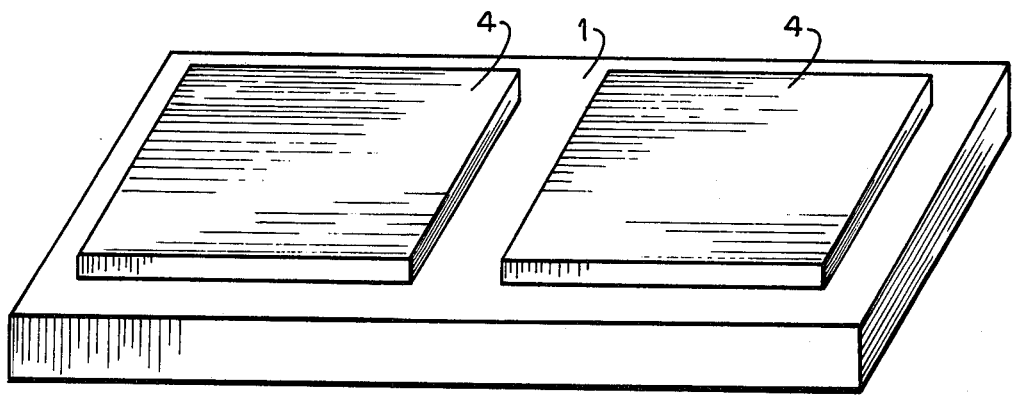
FIG. 7 is a perspective view showing the appearance after explosion-welding two plating sheets to the base material (tandem joining).

FIGS. 6 and 7 show the appearance of the plates after explosion-welding in the case of single or tandem firing, respectively. The tandem-fired package is split prior to rolling.

I claim:

1. A method of manufacturing a compound plate by explosion-welding, said compound plate being intended for subsequent package-rolling, characterised in that the plating material is smaller in area than the base material so that an edge is left around the periphery of the base material without any plating, that this free edge surface of the base material is protected by the attachment of metal strips, that an explosive charge is placed on top of the plating material, said charge having an area at least as great as that of the base material, after which the explosive charge is detonated.

2. A method according to claim 1, wherein the detonation of the explosive charge is initiated along a line.

3. A method according to claim 1, wherein the detonation of the explosive charge is initiated at a point.

4. A method according to claim 1, wherein at each firing only one plating sheet is explosion-welded to the base material.

5. A method according to claim 1, wherein at each firing two or more plating sheets are simultaneously explosion-welded to the base material in parallel.

* * * * *